United States Patent
Kurtovic

(10) Patent No.: US 9,604,571 B1
(45) Date of Patent: Mar. 28, 2017

(54) SYSTEMS AND METHODS FOR WARNING A THIRD PARTY ABOUT A TEMPERATURE CONDITION FOR A FORGOTTEN OCCUPANT BASED ON ESTIMATED TEMPERATURE

(71) Applicant: Toyota Motor Engineering & Manufacturing North America, Inc., Erlanger, KY (US)

(72) Inventor: Kenan Kurtovic, Ferndale, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 15/090,975

(22) Filed: Apr. 5, 2016

(51) Int. Cl.
*B60Q 1/00* (2006.01)
*B60Q 9/00* (2006.01)

(52) U.S. Cl.
CPC ..................... *B60Q 9/00* (2013.01)

(58) Field of Classification Search
CPC .......... B60Q 9/00; G08B 21/00; G08B 21/02; B60R 21/00
USPC ..................... 340/449, 457, 573.1
See application file for complete search history.

(56) References Cited

U.S. PATENT DOCUMENTS

| | | | |
|---|---|---|---|
| 6,768,420 B2 | 7/2004 | McCarthy et al. | |
| 6,922,147 B1 * | 7/2005 | Viksnins | B60N 2/002 180/272 |
| 7,218,211 B2 * | 5/2007 | Ho | G08B 21/24 180/273 |
| 8,212,665 B2 * | 7/2012 | Schoenberg | B60N 2/002 307/10.1 |
| 8,768,292 B2 | 7/2014 | Welch | |
| 9,014,920 B1 | 4/2015 | Torres et al. | |
| 2002/0161501 A1 * | 10/2002 | Dulin | B06B 1/0215 701/45 |
| 2004/0113797 A1 * | 6/2004 | Osborne | B60N 2/002 340/573.4 |
| 2012/0242476 A1 | 9/2012 | Schoenberg et al. | |

FOREIGN PATENT DOCUMENTS

| | | |
|---|---|---|
| CA | 2698162 | 1/2013 |
| WO | 2014128273 | 8/2014 |

* cited by examiner

*Primary Examiner* — Tai Nguyen
(74) *Attorney, Agent, or Firm* — Dinsmore & Shohl LLP

(57) ABSTRACT

A system and method for warning a third party about a temperature condition for a forgotten occupant based upon an estimated temperature. The system and method include retrieving a weather forecast for an area in which the vehicle is located and estimating a future temperature of the passenger compartment in response to determining that the drive system of the vehicle has been shut off and that the driver has exited the vehicle, the method determines whether an occupant remains in the passenger compartment of the vehicle. The future temperature of the passenger compartment is a temperature of the passenger compartment of the vehicle after a lapse of a predetermined time period. In response to determining that the estimated future temperature is outside of the predetermined temperature range send a warning to the computing device.

20 Claims, 7 Drawing Sheets

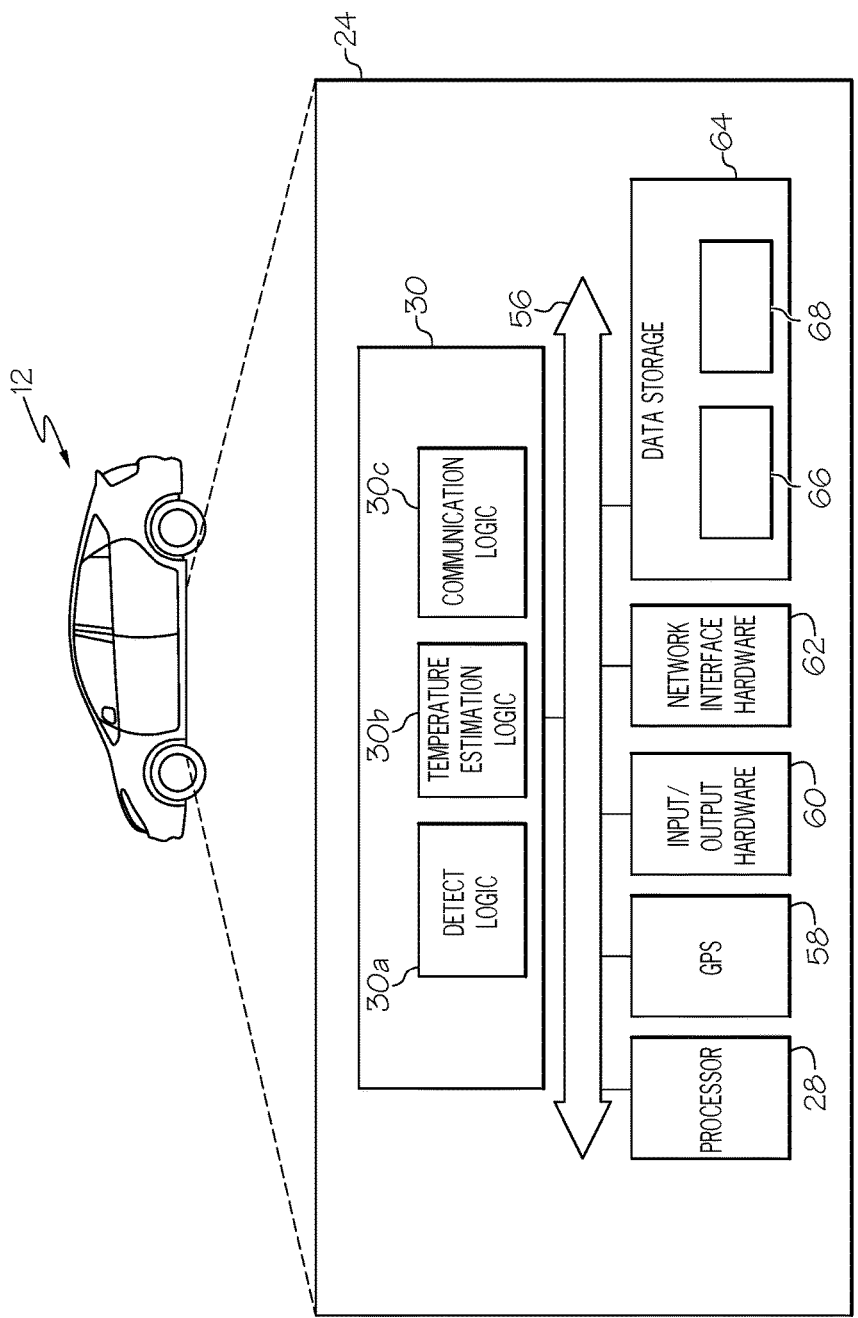

US 9,604,571 B1

SYSTEMS AND METHODS FOR WARNING A THIRD PARTY ABOUT A TEMPERATURE CONDITION FOR A FORGOTTEN OCCUPANT BASED ON ESTIMATED TEMPERATURE

TECHNICAL FIELD

The present specification generally relates to systems and methods for warning a third party about a temperature condition and, more specifically, systems and methods for warning a third party about a temperature condition for a forgotten occupant based on an estimated future temperature of a passenger compartment of a vehicle.

BACKGROUND

There are currently forgotten occupant warning systems that alert a third party, such as a driver, when an occupant remains in a passenger compartment of a vehicle after the vehicle has been shut off and the driver has exited the vehicle. Further, the known forgotten occupant warning system issues a temperature condition warning when an actual temperature of the passenger compartment of the vehicle exceeds a predetermined temperature. However, the previously known forgotten occupant warning systems utilize a temperature sensor provided within the passenger compartment of the vehicle.

Such systems have proven useful for issuing a temperature condition warning in situations in which the actual temperature in the passenger compartment of the vehicle is at a predetermined level. However, a driver may disregard warnings or fail to take the required countermeasures until the actual temperature of the passenger compartment of the vehicle exceeds the predetermined threshold. For example, a driver is not warned of a temperature condition at the time of exiting the vehicle if the current actual temperature of the passenger compartment of the vehicle is less than the predetermined temperature. Therefore, a driver may disregard a forgotten occupant alert, that an occupant remains in the vehicle, based on the current actual temperature. For example, the driver may not take into account the future temperature of the passenger compartment of the vehicle, thereby erroneously disregarding a future temperature condition for the forgotten occupant.

Accordingly, a need exists for alternative systems and methods for warning a third party of a temperature condition outside a predetermined temperature range for a forgotten occupant based on an estimated future temperature of the passenger compartment.

SUMMARY

In one embodiment a system for warning a third party about a temperature condition for a forgotten occupant based upon an estimated temperature includes a main sensor, a driver sensor, a forgotten occupant sensor, a transceiver, a mobile computing device, and an electronic control unit. The main sensor determines that a drive system of the vehicle has been shut off. The driver sensor determines that a driver has exited a passenger compartment of the vehicle. The forgotten occupant sensor determines that an occupant remains in the passenger compartment of the vehicle after the main sensor determines that the drive system has been shut off and the driver sensor determines that the driver has exited the passenger compartment of the vehicle. The transceiver retrieves a weather forecast for an area in which the vehicle is located. The electronic control unit includes a processor and a memory unit that is coupled to the processor. The memory unit stores logic that, when executed by the processor, causes the electronic control unit to estimate a future temperature of the passenger compartment of the vehicle and determine whether the estimated future temperature is outside of a predetermined temperature range. The future temperature of the passenger compartment is a temperature of the passenger compartment of the vehicle after a lapse of a predetermined time period. In response to determining that the estimated future temperature is outside of the predetermined temperature range, a warning is sent to the mobile computing device. The warning indicates that an occupant remains in the passenger compartment of the vehicle and that the temperature of the passenger compartment of the vehicle will be outside of the predetermined temperature range after the lapse of the predetermined time period.

In another embodiment, a method for warning a third party about a weather condition for a forgotten occupant based upon an estimated temperature including determining whether a drive system of the vehicle has been shut off and whether a driver has exited a passenger compartment of the vehicle. In response to determining that the drive system of the vehicle has been shut off and that the driver has exited the vehicle, the method determines whether an occupant remains in the passenger compartment of the vehicle. In response to determining that an occupant remains in the passenger compartment of the vehicle, a weather forecast for an area in which the vehicle is located is retrieved and a future temperature of the passenger compartment is estimated. The future temperature of the passenger compartment is based upon the retrieved weather forecast for the area in which the vehicle is located. The future temperature of the passenger compartment is a temperature of the passenger compartment of the vehicle after a lapse of a predetermined time period. The method includes determining whether the estimated future temperature is outside of a predetermined temperature range. In response to determining that the estimated future temperature is outside of the predetermined temperature range, the a warning is sent to the third party. The warning indicates that an occupant remains in the passenger compartment of the vehicle and the temperature of the passenger compartment of the vehicle will be outside of a predetermined temperature range after the lapse of the predetermined time period.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 schematically depicts a system for warning a third party about a temperature condition for a forgotten occupant based upon an estimated future temperature, according to one or more embodiments described herein;

DETAILED DESCRIPTION

Figure 1:
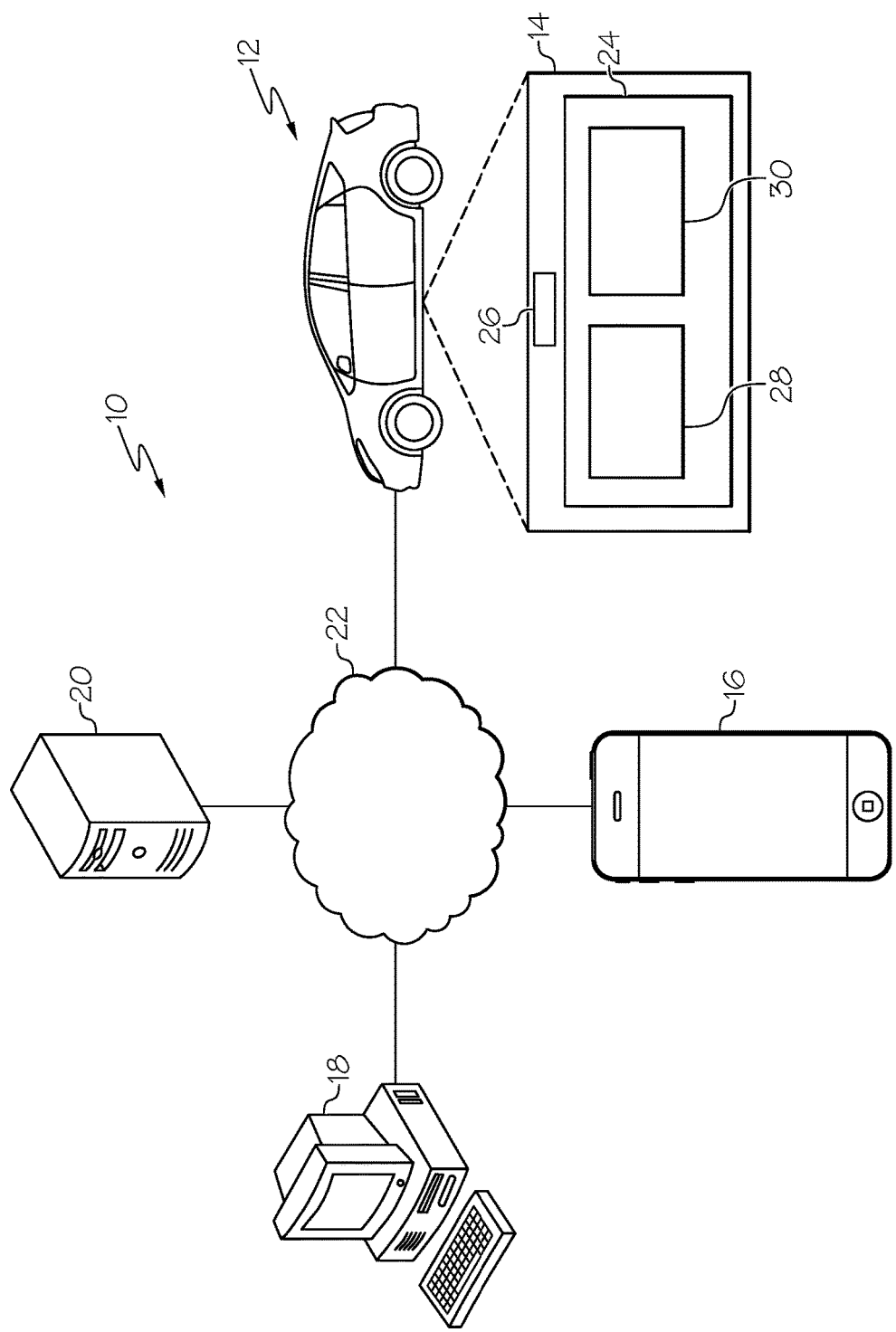
FIG. 1 schematically depicts an environment for warning a third party about a temperature condition based upon an estimated temperature, according to one or more embodiments shown and described herein.

FIG. 1 generally depicts an embodiment of a system for warning a third party of a temperature condition for a forgotten occupant based upon an estimated temperature. The system generally comprises a vehicle that includes an onboard computing device, a mobile computing device, an administration system, and a weather data service. The onboard computing device is in communication with the mobile computing device, the administrator computing device, and the weather data service through a network. Various embodiments of the forgotten occupant warning system and the operation and a method of warning a third party of a forgotten occupant based upon estimated temperature will be described in more detail herein.

Embodiments disclosed herein include systems and methods for warning a third party of a temperature condition outside a predetermined range for a forgotten occupant based upon estimated temperature. Some embodiments include hardware and/or software for determining whether a vehicle drive system has been shut down, whether a driver has exited the vehicle, whether an occupant remains in the vehicle, and whether an estimated future temperature will be outside of a predetermined range. Specifically, the embodiments disclosed herein may be configured to estimate a future temperature of the passenger compartment of the vehicle as a temperature after a lapse of a plurality of predetermined time periods. In some embodiments, the systems and methods issue a warning to a third party that the estimated future temperature of the passenger compartment will be outside a predetermined range prior to the actual temperature of the passenger compartment of the vehicle being outside of the predetermined range. Specifically, the systems and methods estimate a future temperature of the passenger compartment of the vehicle based on local weather forecasts for the area in which the vehicle is located. As such, a third party, such as a driver, can be warned about a temperature condition in advance of the actual temperature of the passenger compartment of the vehicle being outside of a predetermined temperature range.

In some embodiments, when it is determined that a future temperature is outside of the predetermined range, a warning is issued to a third party, such as a driver. The warning identifies that the temperature of the vehicle compartment is estimated to be outside the predetermined range after the lapse of the predetermined time period. Some embodiments may be configured to provide a signal to a mobile computing device, such as a mobile telephone. The warning provides countermeasures to the third party. The countermeasures are initiated over the mobile computing device to prevent the actual temperature from reaching the estimated temperature. Similarly, a warning may be provided to a third party such as a first responder administrator including police, EMTs, and fire departments or any other local authority to assist the forgotten occupant prior to the actual temperature of the passenger compartment of the vehicle extending outside the predetermined temperature range.

Referring now to the drawings, FIG. 1 schematically depicts an environment of a system for warning a third part about a temperature condition. As illustrated, the system 10 includes a vehicle 12 having an onboard computing device 14, a mobile computing device 16, an administrator computing device 18, and a weather data service 20. In some embodiments, a network 22 couples the vehicle 12, the mobile computing device 16, the administrator computing device 18, and the weather data service 20. In some embodiments the network 22 may include a wide area network, such as an internet or cellular network (such as 3G, 4G, 4G LTE, WiMAX, etc.). Similarly, the network 22 may include a local area network, such as a wireless fidelity (Wi-Fi) network, a Bluetooth network, a near field communication network, hardware, and the like.

The onboard computing device 14 of the vehicle 12 includes an electronic control unit 24 and a transceiver 26. The transceiver 26 is in electrical communication with the electronic control unit 24 and is connected to the network 22 to couple the vehicle 12 to the network 22.

The mobile computing device 16 may be configured as a mobile phone, a tablet, a personal computer, and/or other devices for performing the functionality described herein. The mobile computing device 16 may be operated by a third party such as a driver or other occupant or owner of the vehicle 12. Similarly, the administrator computing device 18 may be configured as a personal computer, tablet, mobile telephone, etc., and operated by an administrative authority that is situated for assisting in emergency situations including first responders, police departments, fire departments, 911 service, Emergency Medical Technicians, or other local authorities.

As depicted in FIG. 1, the electronic control unit 24 includes a processor 28 and a memory component 30 coupled to the processor 28. The memory component 30 stores logic such as detection logic 30a, the temperature estimation logic 30b, and the communication logic 30c, as illustrated in FIG. 3.

Figure 2:
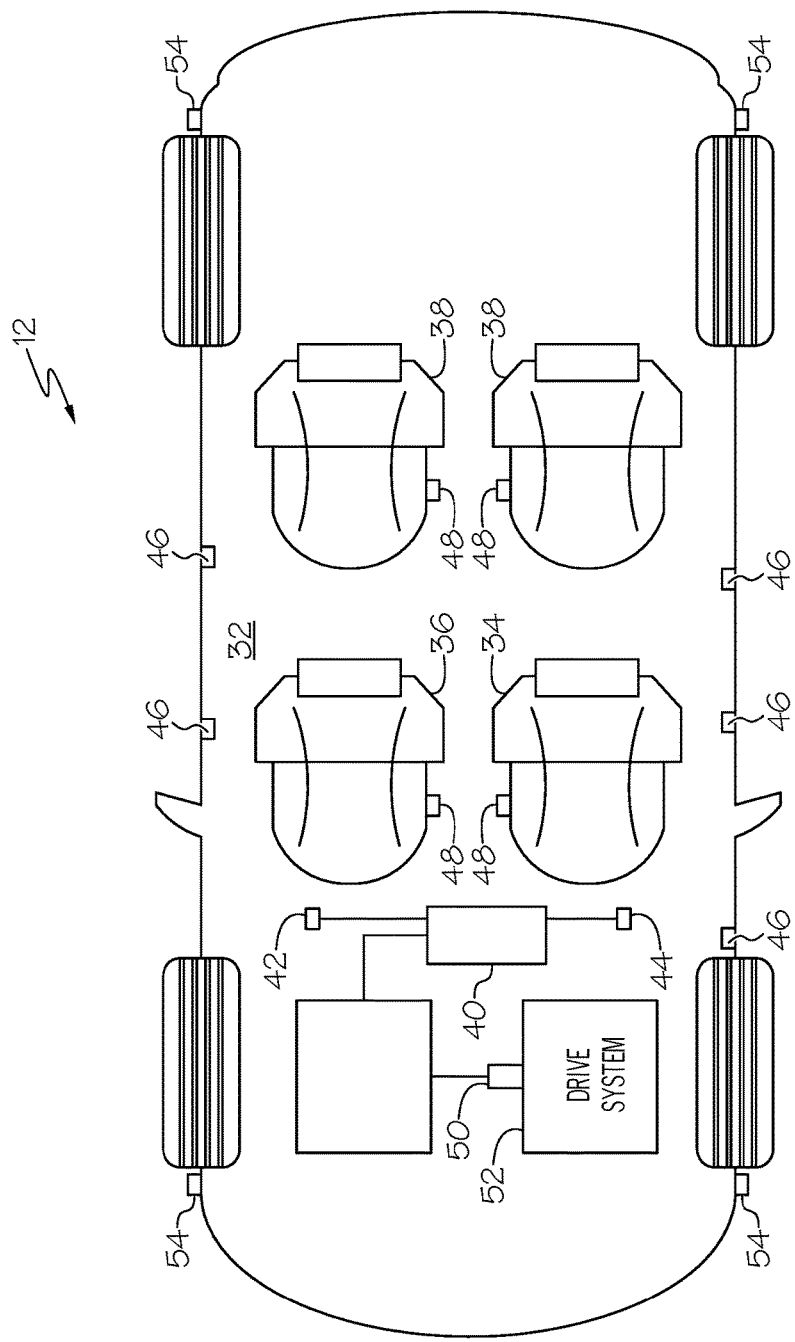
FIG. 2 schematically depicts a vehicle interior which includes a plurality of sensors, according to one or more embodiments shown and described herein.

FIG. 2 schematically depicts an interior of the vehicle 12. Specifically, the vehicle 12 includes a passenger compartment 32 provided in an interior thereof. The passenger compartment 32 is a portion of an interior of the vehicle 12 which passengers or other occupants occupy. A plurality of vehicle seats including a front driver seat 34, front passenger seat 36, and one or more rear passenger seats 38 are provided within the passenger compartment 32 of the vehicle 12. The vehicle 12 includes a display unit 40 which is coupled to at least one microphone 42 and at least one speaker 44. The at least one microphone 42 and the at least one speaker 44 are provided within the passenger compartment 32 of the vehicle 12.

Various sensors 46 are provided in the passenger compartment 32 of the vehicle 12. Further, seat sensors 48 are provided on the front driver seat 34, front passenger seat 36, and the rear passenger seats 38. In some embodiments the various sensors 46 include cameras, microphones, pressure sensors in the floor, and door sensors that determine the opening and closing of the vehicle door. The seat sensors 48 optionally include pressure sensors provided in the seat cushion of the front driver seat 34, front passenger seat 36, and one or more rear passenger seats 38. The at least one microphone 42, at least one speaker 44, the various sensors 46, and the seat sensors 48 are in communication with the electronic control unit 24 of the onboard computing device 14.

An ignition sensor 50 is provided on a drive system 52 of the vehicle 12. The ignition sensor 50 is in communication with the electronic control unit 24 as shown in FIG. 2. The ignition sensor 50 determines whether the drive system 52 has been put in a shut off or deactivated state. In some embodiments, the drive system 52 includes an internal combustion engine, motor generator, or combination thereof. The ignition sensor could be any sensor suitable for determining engine ON/OFF, such as any one or more of oil pressure, fuel pressure, crankshaft position, camshaft position, spark plug operation, and battery voltage.

The ignition sensor 50 operates as a main sensor that determines that the drive system 52 has been shut off. The ignition sensor 50 issues a signal to the electronic control unit 24 indicating that the drive system 52 of the vehicle 12 has been shut off.

The at least one microphone 42, the at least one speaker 44, the various sensors 46 and the seat sensor 48 provided on the front driver seat 34 operate as a driver sensor. The driver sensor determines the presence or absence of a driver in the passenger compartment 32 of the vehicle 12 after it is determined by the main sensor that the drive system 52 has been has shut off. The driver sensor issues a signal to the electronic control unit 24 indicating that the driver has exited the passenger compartment 32 of the vehicle 12.

The at least one microphone 42, the at least one speaker 44, the various sensors 46 and the seat sensors 48 operate as a forgotten occupant sensor. The forgotten occupant sensor determines the presence or absence of an occupant in the passenger compartment 32 of the vehicle 12, after it is determined by the driver sensor that the driver has exited the passenger compartment 32 of the vehicle 12. The forgotten occupant sensor issues a signal to the electronic control unit 24 indicating that an occupant remains in the passenger compartment 32 of the vehicle 12 after the driver has exited the vehicle 12. In some embodiments, the forgotten occupant sensor determines the presence or absence of an occupant in the passenger compartment 32 of the vehicle 12 after a lapse of a preset time period.

A plurality of environmental condition sensors 54 are provided on the exterior of the vehicle 12. The environmental condition sensors 54 are in communication with the electronic control unit 24. The environmental condition sensors 54 detect an environmental condition. In some embodiments, the environmental condition sensors 54 include sun load sensors and rain sensors. The sun load sensors determine the amount of sun light that is exposed to the vehicle 12. Specifically, the sun sensors issue a signal to the electronic control unit 24 corresponding to the amount of sun light that is received by the vehicle 12.

The rain sensors determine the presence or absence of precipitation that is exposed to the vehicle 12. Specifically, the rain sensors issue a signal to the electronic control unit 24 corresponding to the amount of precipitation that is received by the vehicle 12. In some embodiments, the rain sensor is provided as a sensor used in an automatic windshield wiping system that automates the windshield wipers when precipitation is detected.

With reference to FIG. 3, the electronic control unit 24 of the onboard computing device 14 is discussed in greater detail. The electronic control unit 24 includes the processor 28, the memory component 30, a local interface 56, a global positioning system (GPS) 58, an input/output hardware 60, a network interface hardware 62, and a data storage component 64. The data storage component 64 stores temperature map data 66, and environmental conditions data 68. The memory component 30 and the data storage component 64 operate as the memory unit of the electronic control unit 24.

In some embodiments the processor 28 includes processing components operable to receive and execute instructions (such as from a data storage component 64 and/or the memory component 30).

The memory component 30 stores detection logic 30a, temperature estimation logic 30b, and communication logic 30c. The detection logic 30a, temperature estimation logic 30b, and the communication logic 30c may each include a plurality of different pieces of logic, each of which may be embodied as a computer program, firmware, and/or software/hardware.

The detection logic 30a is executable by the processor 28 to detect one or more signals from sensors provided in the vehicle 12. For example, the detection logic 30a is configured to cause the processor 28 to determine whether the drive system 52 has been shut off, the driver has exited the vehicle 12, an occupant remains in the passenger compartment 32 of the vehicle 12, and whether the estimated future temperature of the passenger compartment 32 of the vehicle 12 is outside of a predetermined temperature range.

The temperature estimation logic 30b is executable by the processor 28 to estimate a future temperature of the passenger compartment 32 of the vehicle 12 based on the weather data from the weather data service 20 using the temperature map data 66. The temperature estimate logic 30b is executable by the processor 28 to correct the estimated future temperature of the passenger compartment 32 of the vehicle based using the output from the environmental condition sensors 54 and the environmental conditions data 68. The future temperature is a temperature of the passenger compartment 32 of the vehicle 12 after the lapse of the predetermined time period.

The communication logic 30c is executable by the processor 28 to cause the onboard computing device 14 to communicate with the network 22 through the network interface hardware 62 and/or the transceiver 26 to communicate with the mobile computing device 16, administrator computing device 18, and the weather data service 20.

In some embodiments, the memory component 30 is configured as volatile and/or nonvolatile memory and as such may include random access memory (SRAM, DRAM, and/or other types of RAM), flash memory, secure digital (SD) memory, registers, compact discs, digital versatile discs (DVD), and/or other types of nontransitory computer readable mediums. Depending on the particular embodiments, these nontransitory computer readable mediums may reside within the onboard computing device 14 and/or external to the onboard computing device 14.

The local interface 56 is implemented as a bus or other communication interface to facilitate communication among the components of the electronic control unit 24.

The GPS 58 is used in conjunction with the processor 28 to determine the area in which the vehicle 12 is located. The input/output hardware 60 may include or be configured to interface with the various other components of the vehicle 12. As an example, the input/output hardware 60 may include the display unit 40, at least one microphone 42, the at least one speaker 44, the various sensors 46, the seat sensors 48, the ignition sensor 50, the environmental condition sensors 54, and/or the other hardware in the vehicle 12, as shown in FIG. 2.

The network interface hardware 62 may include or be configured to interface with the transceiver 26 to connect to the network 22. As an example, the network interface hardware 62 is operable to communicate with any wired or wireless network hardware, including an antenna, a modem, a LAN, wireless fidelity (Wi-Fi) card, WiMAX card, mobile communications hardware, and/or other hardware for communicating with other networks and/or devices. From this connection, communication is made through the transceiver 26 using the network interface hardware 62 thereby facilitating communication between the electronic control unit 24, the mobile computing device 16, the administrator computing device 18, and the weather data service 20 through the network 22.

It should be understood that while the components of FIG. 3 are illustrated as residing within the electronic control unit 24, this is merely an example thereof. In some embodiments, one or more of the components may reside external to the electronic control unit 24. It should also be understood that while the electronic control unit 24 is illustrated as a single device, this is also merely an example. In some embodiments, the detection logic 30a, the temperature estimation logic 30b, and the communication logic 30c may reside on different computing devices. As an example thereof, one or more of the functionalities and/or components described herein may be provided by the mobile computing device 16, the administrator computing device 18, which may be coupled to the vehicle 12 via the network 22.

The temperature map data 66 includes pre-stored temperature maps that correlate the effects of local weather forecasts onto the vehicle 12 to estimate the future temperature in the passenger compartment 32. The environmental conditions data 68 includes pre-stored environmental conditions data that correlates the effects of the environmental conditions exposed to the vehicle 12 to correct the estimated future temperature. The environmental conditions data includes the effects of the amount of sun light received by the vehicle 12 and the amount of precipitation from the environmental conditions sensors 54 that is exposed to the vehicle 12. The data, algorithms, and/or logic used in the temperature map data 66 and the environmental conditions data 68 are found through experimentation.

Figure 4A:
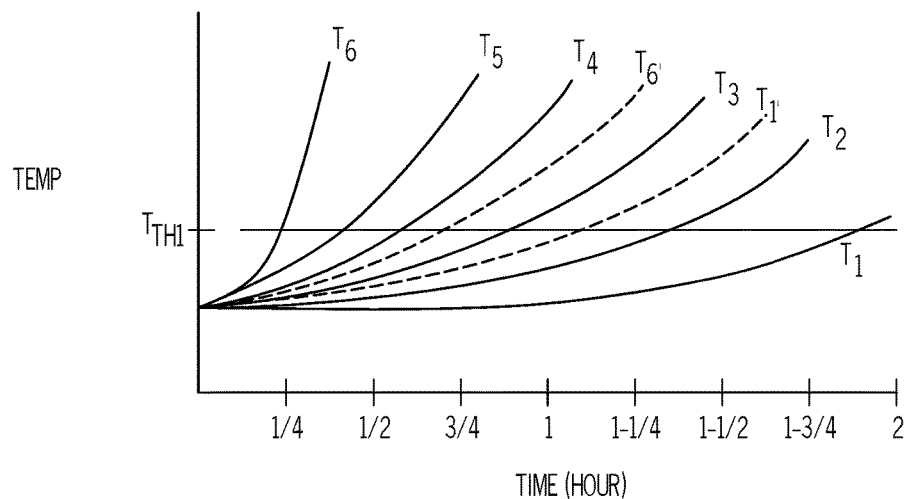
FIG. 4A depicts a pre-stored map used to estimate a future temperature and determine whether the estimated future temperature exceeds an upper threshold of a predetermined range, according to one or more embodiments described herein.
Figure 4B:
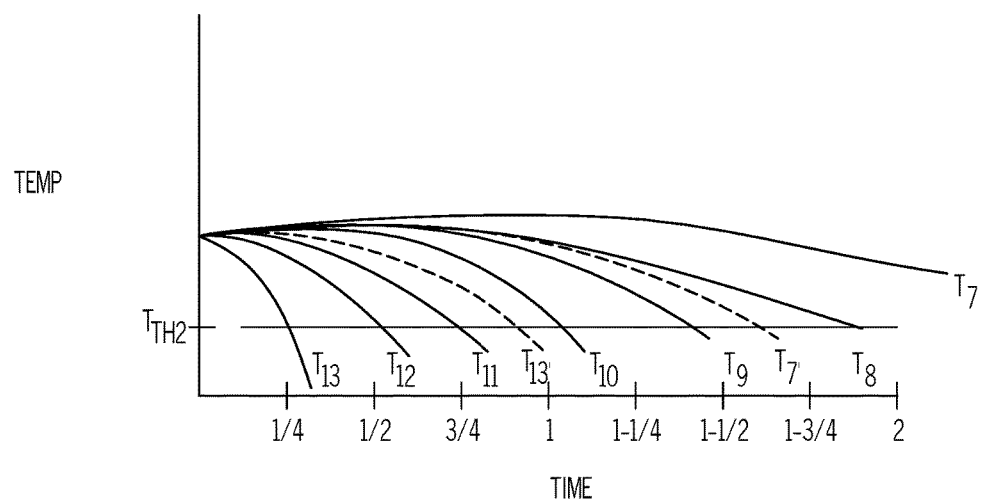
FIG. 4B depicts a pre-stored map used to estimate a future temperature and determine whether the estimated future temperature will fall below a lower limit threshold of a predetermined range, according to one or more embodiments described herein.

With reference to FIGS. 4A and 4B, the estimation of a future temperature of the passenger compartment 32 of the vehicle 12 based upon the weather forecast will now be discussed. FIGS. 4A and 4B schematically illustrate temperature maps pre-stored in the temperature map data 66 and environmental condition data pre-stored in the environmental conditions data 68.

The temperature maps of FIG. 4A and FIG. 4B are used to estimate a future temperature of the passenger compartment 32 of a vehicle 12 based upon the weather forecast. Specifically, processor 28 executes the temperature estimation logic 30b using the temperature map data 66 and the retrieved local weather forecast to estimate a future temperature at a lapse of a predetermined time period.

The local weather forecast is mapped onto the temperature maps stored in the temperature map data 66. Specifically, the temperature estimation logic 30b is executed by the processor 28 to estimate a future temperature of the vehicle 12. As shown in FIGS. 4A and 4B, various estimated future temperatures T1-T6 and T7-T13, respectively, are estimated based on various different local weather forecasts. The estimated future temperatures are provided at a plurality of predetermined time periods so as to estimate a future temperature of the passenger compartment 32 of the vehicle 12 at various points in the future.

As shown in FIG. 4A, an upper temperature threshold TH1 is provided as an upper limit of a predetermined temperature range. Similarly, as shown in FIG. 4B, a lower temperature threshold TH2 is provided as a lower limit of the predetermined temperature range. The predetermined temperature range is a temperature range that provides suitable temperatures for a forgotten occupant in the passenger compartment 32 of the vehicle 12.

The upper limit of the predetermined temperature range, is a temperature that, once exceeded is a hot condition for the forgotten occupant. The lower limit of the predetermined temperature range, is a temperature that once beneath is a cold condition for the forgotten occupant. The upper and lower limits of the predetermined temperature range are determined in advance and stored in the temperature map data 66. In some embodiments, the upper limit of the predetermined temperature range is $80° F. \pm 5° F.$. In some embodiments, the lower limit of the predetermined temperature range is $50° F. \pm 5° F.$. In still some other embodiments, the upper and lower limits of the predetermined temperature range are selected by the user, such as a driver.

The estimated future temperatures T1-T6 and T7-13 are then corrected to take into account environmental conditions based on the output of the environmental condition sensors 54 using the environmental conditions data 68. The temperature estimation logic 30b is executed by the processor 28 to correlate the effects of the amount of sun light received by the vehicle 12 and the amount of perception that is exposed to the vehicle 12 to correct the estimated future temperatures T1-T6 and T7-13. The amount or presence/absence of sun light or precipitation received by the vehicle 12 based on outputs from the environmental condition sensors 54. The effect of the amount or presence/absence of sun light or precipitation on the estimated temperatures T1-T6 and T7-13 are determined using the environmental conditions data 68.

For example, the estimated future temperature T1 is based on a particular weather forecast that indicates a high level of cloud cover with low levels of sunlight. As such, the estimated future temperature T1 will not exceed the upper threshold limit TH1 until after the 1¾ hour mark. However, based upon the output of the environmental condition sensors 54, it is determined that the vehicle 12 is in an area receiving a larger amount of direct sunlight than indicated by the particular weather forecast. As such, the temperature estimation logic 30b executed by the processor 28 corrects the estimated future temperature T1 using the output of the environmental condition sensors 54 and the environmental conditions data 68 to output a corrected estimated future temperature T1'. As shown in FIG. 4A, the corrected estimated future temperature T1' will exceed the upper limit TH1 at the 1 hour mark.

Similarly, the estimated future temperature T6 is based on another particular weather forecast that indicates a low level of cloud cover with high levels of sunlight. As such, it is determined that the estimated future temperature T6 will exceed the upper threshold limit TH1 at the ¼ hour mark. However, based upon output of the environmental condition sensors 54, it is determined that the vehicle 12 is in an area receiving a smaller amount of direct sunlight than indicated by the another particular weather forecast. For example, the environmental condition sensors 54, operating as a sun load sensor, indicate that the vehicle 12 is provided in a shaded or covered area receiving little to no sunshine. As such, the temperature estimation logic 30b executed by the processor 28 corrects the estimated future temperature T6 using the output of the environmental condition sensors 54 and the environmental conditions data 68 to output a corrected estimated future temperature T6'. As shown in FIG. 4A, the corrected estimated future temperature T6' will exceed the upper limit TH1 after the ½ hour mark.

As another example, the estimated future temperature T7 is based on a particular weather forecast indicates that a low chance of precipitation, the estimated temperature T7 will not fall below the lower threshold limit TH2 prior to the 2 hour mark. However, based upon the output of the environmental condition sensors 54, operating as a rain sensor, it is determined that the vehicle 12 is in an area receiving a precipitation. As such, the temperature estimation logic 30b executed by the processor 28 corrects the estimated future temperature T7 using the output of the environmental condition sensors 54 and the environmental conditions data 68 to output a corrected estimated future temperature T7'. As shown in FIG. 4B, the corrected estimated future temperature T7' will fall below the lower limit TH2 between the 1½ and 1¾ hour marks.

Similarly, the estimated future temperature T13 is based on another particular weather forecast that indicates a high chance of precipitation. As such, it is determined that the future estimated temperature T13 will fall below the lower threshold limit TH2 between the ¼ and ½ hour marks. However, based upon output of the environmental condition sensors 54, operating as precipitation sensor, it is determined that the vehicle 12 is in an area receiving no precipitation. For example, the environmental condition sensors 54, operating as a precipitation sensor, indicates that the vehicle 12 is provided in a covered area or that no precipitation is received. As such, the temperature estimation logic 30b executed by the processor 28 corrects the estimated future temperature T13 using the output of the environmental condition sensors 54 and the environmental conditions data 68 to output a corrected estimated future temperature T13'. As shown in FIG. 4B, the corrected estimated future temperature T13' will fall below the lower limit TH2 between the ¾ and the 1 hour marks.

Figure 5A:
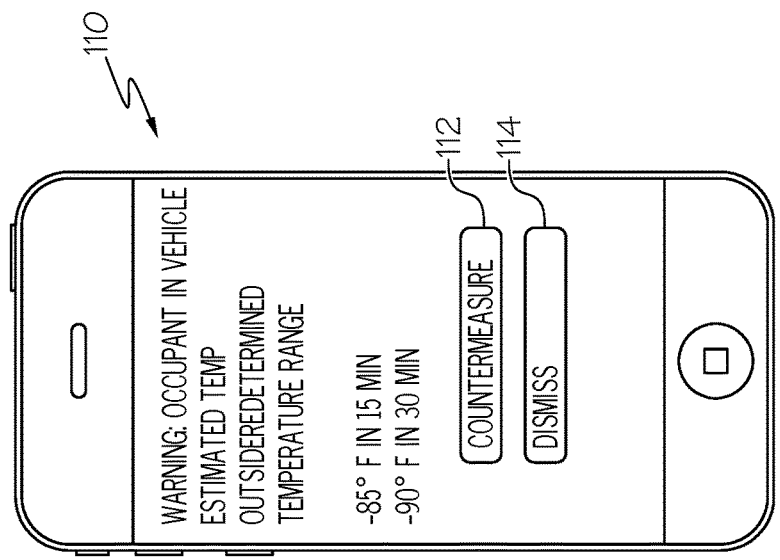
FIG. 5A schematically depicts a user interface that provides a warning to a third party about a danger temperature condition for a forgotten occupant, according to one or more embodiments described herein.

With reference to FIG. 5A, a user interface 110 of at least one of the mobile computing device 16 and the administrator computing device 18 is provided. The user interface 110 provides a warning to the third party about a temperature condition of forgotten occupant based upon estimated future temperature according to the embodiments disclosed herein. As discussed above, some embodiments may be configured to notify a third party such as a driver or guardian of the forgotten occupant through the mobile computing device 16 and/or an administrator computing device 18. Accordingly, the user interface 110 provides the third party the estimated future temperature of the passenger compartment 32 based on a plurality of predetermined time periods.

As illustrated in FIG. 5A, the user interface 110 may include the warning of the temperature condition based upon the estimated temperature. Specifically, the user interface 110 provides a warning that the estimated future temperature is outside of the predetermined temperature range. Further, the user interface 110 provides the estimated future temperatures and the predetermined time periods associated with the estimated future temperatures.

Figure 5B:
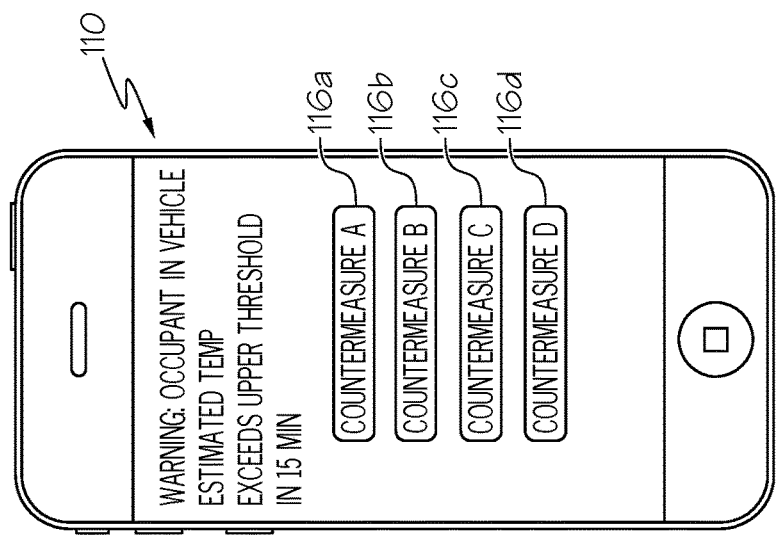
FIG. 5B schematically depicts a user interface that provides countermeasure options to a third party to prevent a realization of an estimated future temperature, according to one or more embodiments described herein.

In some embodiments, the user interface 110 provides options to third party including a countermeasure option 112 and a dismissal option 114, as shown in FIG. 5A. The user interface 110 depicted in FIG. 5B is provided in response to the selection of the countermeasure option 112 in FIG. 5A. In FIG. 5B, the third party is provided with various countermeasure options 116a, 116b, 116c, and 116d. The countermeasure options 116a-116d include control countermeasures and/or warning countermeasures. The countermeasures are provided to prevent the actual temperature from reaching the future estimated temperature by the lapse of the predetermined time period. The above identified countermeasure options 116a-116d are operated respectively by the third party through use of the mobile computing device 16 and/or the administrator computing device 18, as shown in FIG. 1.

In some embodiments, the control countermeasures identified in any one of 116a-116b illustratively include at least partial opening of windows of the vehicle 12, operation of a vehicle HVAC system, including the starting of the drive system 52, and unlocking of the vehicle doors. In some embodiments, the warning countermeasure are used to alert authorities or passersby are provided in any one of the countermeasure options 116a-116d illustratively including actuation of a horn of the vehicle 12, actuation of headlights of the vehicle 12, cabin lights in a unique pattern (SOS), and use of telemetrics to contact the administrator computing device 18 using the network interface hardware 62.

In some embodiments, the electronic control unit 24 can control the vehicle 12 to automatically select one of the described countermeasure options 116a-116d upon the temperature in the passenger compartment 32 being outside of the predetermined temperature range. In some further embodiments, the electronic control unit 24 can control the vehicle 12 to automatically select one of the described countermeasures upon lapse of a preset time without a selection of a countermeasure by the third party.

Figure 6A:
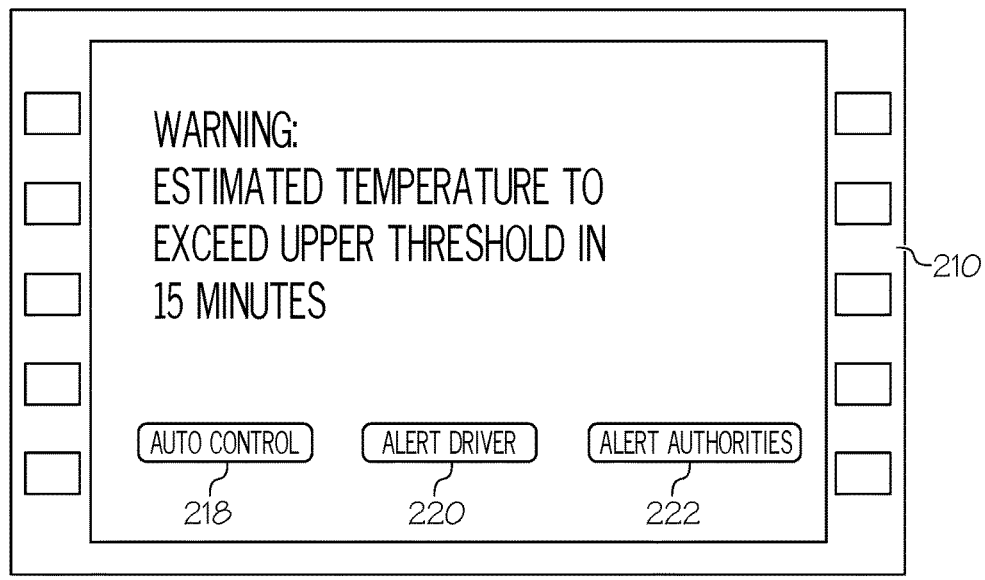
FIG. 6A schematically depicts a user interface for alerting a forgotten occupant in a passenger compartment of a vehicle that an estimated future temperature falls outside of a predetermined temperature range, according to one or more embodiments described herein.
Figure 6B:
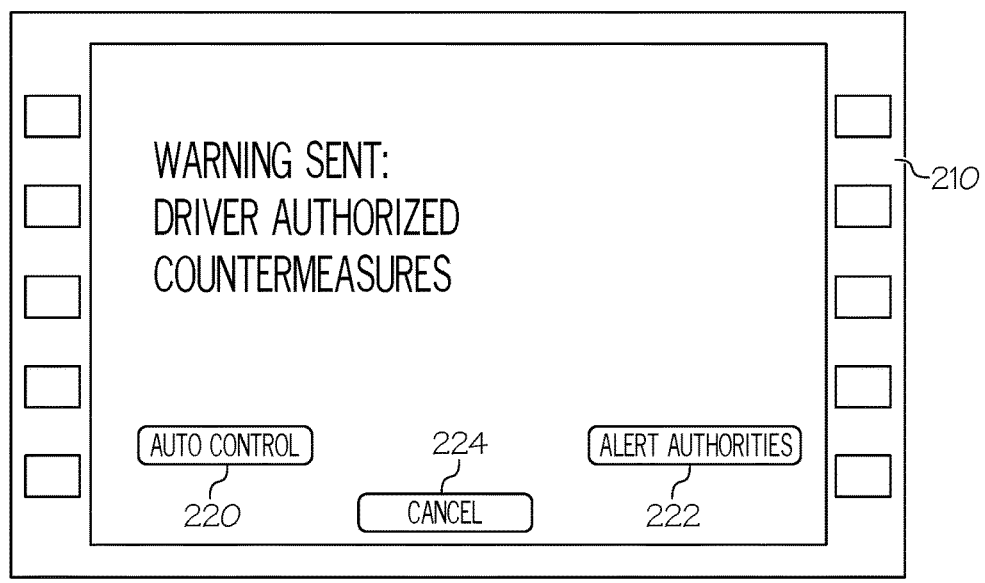
FIG. 6B schematically depicts a user interface for providing a message from a third party to a forgotten occupant in a passenger compartment of a vehicle, according to one or more embodiments disclosed herein.

With reference to FIGS. 6A and 6B, a user interface 210 for providing a warning or message from the third party to the forgotten occupant is schematically depicted. As disclosed above, some of the embodiments may be configured to alert a third party via the mobile computing device 16 or administrator computing device 18 when an estimated future temperature is outside of the predetermined temperature range after the lapse of a predetermined time period. In some embodiments, the user interface 210 is provided on the display unit 40. Specifically, the mobile computing device 16 and/or the administrator computing device 18 operates as the computing device to receive the warning indicating that an occupant remains in the passenger compartment 32 of the vehicle 12 and that the temperature of the passenger compartment 32 of the vehicle 12 will be outside the predetermined temperature range after the lapse of the predetermined time period.

The user interface 210 of FIG. 6A provides the forgotten occupant with a warning indication regarding the estimated temperature being outside of the predetermined temperature range after the lapse of the predetermined time period. Further, the user interface 210 provides the forgotten occupant with an auto control option 218, an alert driver option 220, and an alert authorities option 222. The auto control option 218 initiates any one of the control countermeasures or warning countermeasures of 116a-116d to prevent the actual temperature reaching the estimated future temperature after the expiration of the predetermined time period. The communications established by the alert driver option 220 and the alert authorities option 222 utilize the display unit 40, the at least one microphone 42, and the at least one speaker 44, as shown in FIG. 2.

The alert driver option 220 utilizes the network interface hardware 62 to initiate a communication link to the driver through the mobile computing device 16 to provide a communication link between the forgotten occupant and driver. Similarly, the alert authorities option 222 utilizes the network interface hardware 62 to establish a communication link between the forgotten occupant and the administrator computing device 18. In some embodiments, the third party, such as the driver or authorities, can select one of the countermeasure options 116a-116d. The alert provided by the user interface 210 is provided by the display unit 40 in the vehicle 12. Similarly, the alert is provided in a textual display as illustrated in FIG. 6A; however, the alert can be provided in audio format utilizing the at least one speaker 44.

FIG. 6B illustrates the user interface 210 after the third party has initiated one of the countermeasure options 116a-116d and provides a communication regarding the operation of the selected countermeasure. Specifically, the user interface 210 will provide a communication either through textual display on the display unit 40 or an audio communication through the at least one microphone 42, and the at least one speaker 44 indicating to the forgotten occupant the countermeasure which will be actuated.

Specifically, in such situations, the user interface 210 will provide a textual or audio communication to the forgotten occupant that the third party, such as the driver, has actuated the drive system 52 so as to indicate to the forgotten occupant why the drive system 52 of the vehicle 12 has turned on. The user interface 210 provides the forgotten occupant with the alert driver option 220 and the alert authorities option 222 along with a cancellation option 224. The cancellation option 224 allows the forgotten occupant to cancel the third party selected countermeasure.

It should be understood that in some embodiments, the warning sent to the administrator computing device 18 is sent when the driver is unresponsive and has failed to select a countermeasure. In some embodiments, however, similar communications may be sent to both the mobile computing device 116 of the driver and simultaneously to the administrator computing device 118. As such, a third party may utilize the countermeasure options 116a-116d provided in the user interface 110 from both a driver utilizing the mobile computing device 116 or an administrator authority realizing the administrator computing device 18.

Figure 7:
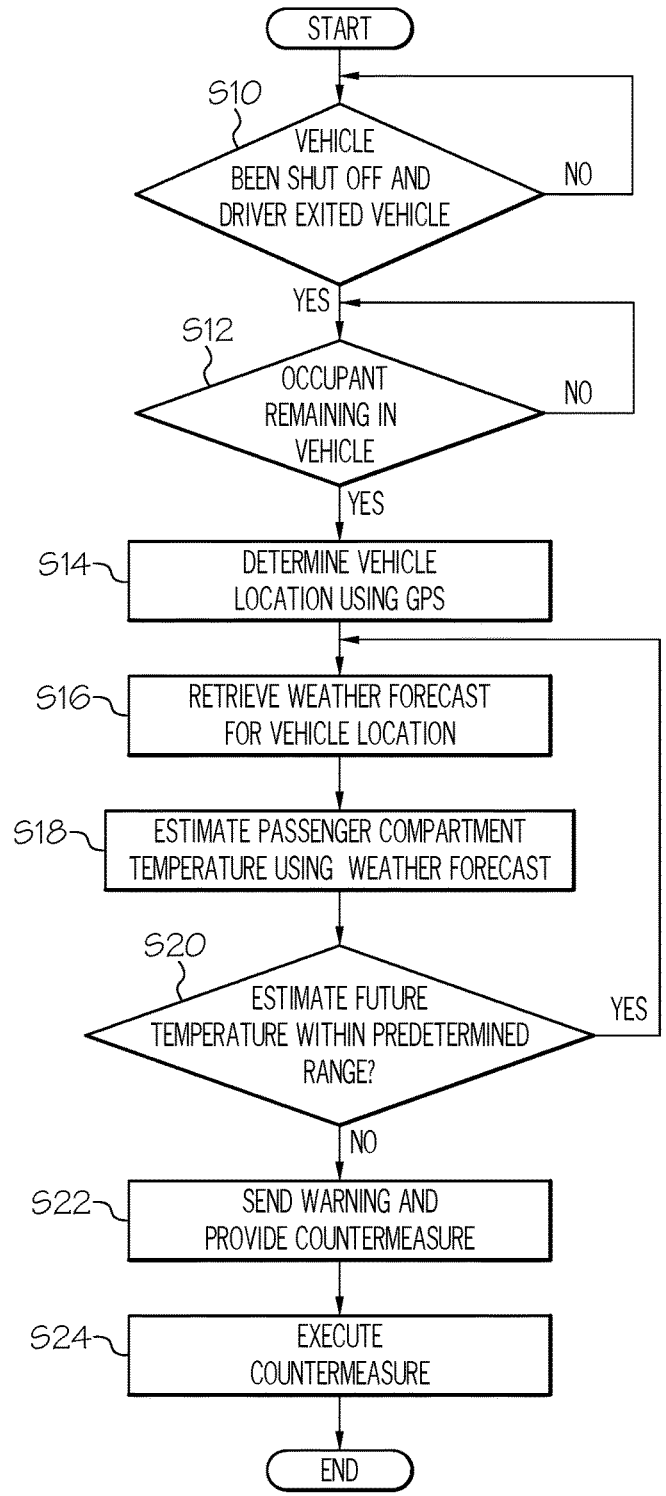
FIG. 7 depicts a flowchart for facilitating a warning to a third party about a temperature condition based on an estimated future temperature, according to one or more embodiments shown and described herein.

FIG. 7 depicts a flowchart for facilitating a warning of a forgotten occupant based upon estimated temperature according to the embodiments disclosed herein. The flowchart depicted in FIG. 7 is executed by the logic stored in the memory component 30 that is executed by the processor 28 in the electronic control unit 24. The process of the flowchart in FIG. 7 is executed at various predetermined time periods.

In step S10 of FIG. 7, a determination is made whether the vehicle 12 has been shut off and the driver has exited the vehicle 12. Specifically, ignition sensor 50 operates as the main sensors to determine whether the drive system has been shut off, and the at least one microphone 42, the at least one speaker 44, the various sensors 46, and the seat sensor 48 of the front driver seat 34 operate as the driver sensor to determine whether the driver has exited the passenger compartment 32 of the vehicle 12.

Upon a NO determination in step S10, the process returns to repeat step S10. Upon a YES determination in step S10 that the vehicle 12 has been shut off and the driver has exited the vehicle 12, the process proceeds to step S12.

In step S12, a determination is made regarding whether an occupant remains in the passenger compartment 32 of the vehicle 12. Specifically, the at least one microphone 42, the at least one speaker 44, the various sensors 46, and the seat sensors 48 operate as the forgotten occupant sensor to determine whether an occupant remains in the passenger compartment 32 of the vehicle 12 after it is determined that the drive system 52 has been shut off and the driver has exited the passenger compartment 32 of the vehicle 12.

Upon a NO determination in step S12, the process repeatedly executes step S12. On the other hand, upon a YES determination in step S12, the process proceeds to step S14 in which a determination of the area in which the vehicle 12 is located is made using the GPS 58. The GPS 58 cooperates with the processor 28 of the electronic control unit 24 to determine a longitude and latitude of the vehicle 12. Utilizing the longitude and latitude of the vehicle 12, the processor 28 determines an area in which the vehicle 12 is located based on map data stored in the GPS 58. In some embodiments, the area in which the vehicle is located is a zip code in which the vehicle 12 is located or a name of a city, town, or county in which the vehicle 12 is located.

Upon determining the area in which the vehicle 12 is located in step S14, the process proceeds to step S16. In step S16, a weather forecast for the area in which the vehicle 12 is located is retrieved. In some embodiments, the processor 28 executes the communication logic 30c to communicate with the weather data service 20 through the network 22 using the network interface hardware 62, such as the transceiver 26. The weather data service 20 is optionally a government service, a free service, or a pay service. In some embodiments, the weather data service 20 is the National Weather Service (NWS), the National Digital Forecast Database, WeatherData Services, Inc, or AccuWeather. The weather data service 20 provides a weather forecast in response to the provided area in which the vehicle 12 is located.

Upon retrieving weather forecast for the area in which the vehicle 12 is located in step S16, the process proceeds to step S18. In step S18, a plurality of future temperatures of the passenger compartment 32 are estimated using the retrieved weather forecast. Specifically, a future temperature is estimated as a temperature of the passenger compartment 32 at a lapse of a plurality of predetermined time periods. Further, the output for the environmental condition sensors 54, the retrieved weather forecast, the temperature map data 66, and the environmental conditions data 68, are used by the processor 28 when executing the temperature estimation logic 30b to correct the estimated temperature, as described above. Specifically, the estimated future temperature is corrected based upon the detected environmental conditions from the environmental condition sensors 54 deviating from the retrieved weather forecast.

The process proceeds to the determination step of S20 in which it is determined whether the estimated future temperature is within the predetermined temperature range for the plurality of predetermined time periods. Upon a NO determination in step S20, the process proceeds to execute steps S22-S24. On the other hand, upon a YES determination, the process returns to step S16 to repeat steps S16-S20.

If the corrected estimated future temperature exceeds the upper limit threshold TH1 or falls below the lower limit threshold TH2, the process proceeds to step S22, then a NO determination is made in step S20 that one of the plurality of estimated future temperatures is not within the predetermined temperature range.

In step S22, a warning is sent to the third party about the temperature condition for a forgotten occupant. The warning is sent to the third party to the mobile computing device 16 and/or the administrator computing device 18. The warning is displayed on the user interface 110 of the mobile computing device 16 or the administrator computing device 18. Specifically, the mobile computing device 16 and/or the administrator computing device 18 operates as the computing device to receive the warning indicating that an occupant remains in the passenger compartment 32 of the vehicle 12 and that the temperature of the passenger compartment 32 of the vehicle 12 will be outside the predetermined temperature range after the lapse of the predetermined time period. As discussed above, the warning provided in step S22 includes options for the various control countermeasures and/or the warning countermeasures.

Upon sending the warning in step S22, the process proceeds to step S24. In step S24, the countermeasures are executed. The countermeasures executed in step S24 are provided by the selection by the third party or an automated countermeasure executed based upon a third party failing to select a countermeasure, or a countermeasure selected by the forgotten occupant utilizing the user interface 210.

Upon executing the countermeasure in step S24, the process ends.

As illustrated above, various embodiments for systems and methods for warning a third party of a temperature condition for a forgotten occupant based on an estimated temperature in the passenger compartment 32 are disclosed herein. Accordingly, the embodiments disclosed herein may provide a third party, such as a driver or authority service, with a warning that a future temperature of the passenger compartment of the vehicle will be outside a predetermined temperature range after a lapse of a predetermined time period. The future temperature is estimated based on local weather forecasts for the area in which the vehicle is located, sensor input and temperature map data. Additionally, embodiments may be configured to provide the third party with options to prevent the temperature of the passenger compartment of the vehicle from reaching the estimated future temperature by controlling various aspects of the automotive vehicle. Some embodiments may be configured to provide a warning or alert such that the third party returns to the vehicle to remove the forgotten occupant.

In some embodiments, the temperature condition for the forgotten occupant can be determined based on an estimated temperature without using a detected actual temperature of the passenger compartment of the vehicle. For example, the estimated future temperature does not use an actual temperature of the passenger compartment of the vehicle. However, in some embodiments, the various sensors includes a temperature sensor that detects an actual temperature of the passenger compartment of the vehicle, and the estimated future temperature is based on the actual temperature.

While temperature estimation is described primarily above, the systems and method described herein may be suitable to warn a third part about other weather conditions for a forgotten occupant. For example, the systems and methods described here may by suitable to warn a third part about flooding and/server weather warnings based on local or national severe weather alerts.

It should now be understood that embodiments disclosed herein include systems, methods, and nontransitory computer readable mediums for warning a third party of a temperature condition for a forgotten occupant based on temperature estimation. It should also be understood that these embodiments are merely explanatory and are not intended to limit the scope of the disclosure.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. It is therefore intended that the appended claims cover all such changes and modifications that are within the scope of the embodiments shown and described herein.

What is claimed is:

1. A system for warning a third party about a temperature condition for a forgotten occupant based on estimated temperature, comprising:
   a main sensor that determines that a drive system of a vehicle has been shut off;
   a driver sensor that determines that a driver has exited a passenger compartment of the vehicle;
   a forgotten occupant sensor that determines that an occupant remains in the passenger compartment of the vehicle after the main sensor determines that the drive system has been shut off and the driver sensor determines that the driver has exited the passenger compartment of the vehicle;
   a transceiver that retrieves a weather forecast for an area in which the vehicle is located;
   a computing device; and
   an electronic control unit including a processor and a memory unit that is coupled to the processor, the memory unit stores logic that, when executed by the processor, causes the electronic control unit to:
   estimate a future temperature of the passenger compartment of the vehicle, the future temperature of the passenger compartment is a temperature of the passenger compartment after a lapse of a predetermined time period;
   determine whether the estimated future temperature is outside of a predetermined temperature range; and
   in response to determining that the estimated future temperature is outside of the predetermined temperature range, send a warning to the computing device, the warning indicating that an occupant remains in the passenger compartment of the vehicle and that the temperature of the passenger compartment of the vehicle will be outside of the predetermined temperature range after the lapse of the predetermined time period.

2. The system of claim 1, wherein the transceiver retrieves the weather forecast from a weather data service in response to the main sensor determining that the drive system of the vehicle has been shut off, the driver sensor determining that the driver has exited the passenger compartment of the vehicle, and the forgotten occupant sensor determining that an occupant remains in the passenger compartment of the vehicle.

3. The system of claim 2 further comprising a global positioning system in communication with the electronic control unit,
wherein the electronic control unit determines the area that the vehicle is located based on an output of the global positioning system.

4. The system of claim 3, wherein temperature maps are pre-stored in the memory unit, and wherein the future temperature of the passenger compartment of the vehicle is determines based on the retrieved weather forecast and the temperature maps.

5. The system of claim 1, wherein the predetermined range includes an upper temperature threshold and a lower temperature threshold, and wherein the estimated future temperature is determined to be outside of the predetermined range when the estimated temperature is less than the lower temperature threshold or higher than the upper temperature threshold.

6. The system of claim 1, the predetermined time period includes a plurality of predetermined time periods, and wherein a future temperature of the passenger compartment of the vehicle is estimated after the lapse of each of the plurality of predetermined time periods.

7. The system of claim 6, wherein the warning to the computing device is sent in response to the future temperature of the passenger compartment of the vehicle after the lapse of any of the plurality of predetermined time periods being outside of the predetermined temperature range.

8. The system of claim 1, wherein the warning to the computing device includes an option to execute countermeasures to control the temperature of the passenger compartment of the vehicle.

9. The system of claim 1 further comprising an environmental condition sensor that detects an environmental condition of the vehicle.

10. The system of claim 9, wherein the electronic control unit is configured to correct the estimated future temperature based on an output of the environmental condition sensor and the retrieved weather forecast.

11. A method for warning a third party about a temperature condition for a forgotten occupant based on estimated temperature comprising:
determining whether a drive system of a vehicle has been shut off and whether a driver has exited a passenger compartment of the vehicle;
in response to determining that the drive system of the vehicle has been shut off and that the driver has exited the vehicle, determining whether an occupant remains in the passenger compartment of the vehicle;
in response to determining that an occupant remains in the passenger compartment of the vehicle, retrieving a weather forecast for an area in which the vehicle is located and estimating a future temperature of the passenger compartment based on the retrieved weather forecast for the area in which the vehicle is located, the future temperature of the passenger compartment is a temperature of the passenger compartment of the vehicle after a lapse of a predetermined time period;
determining whether the estimated future temperature is outside of a predetermined temperature range; and
in response to determining that the estimated future temperature is outside of the predetermined temperature range, sending a warning to the third party, the warning indicating that an occupant remains in the passenger compartment of the vehicle and the temperature of the passenger compartment of the vehicle will be outside of the predetermined temperature range after the lapse of the predetermined time period.

12. The method of claim 11 further comprising:
providing an electronic control unit including a processor and a memory unit that is coupled to the processor, the memory unit stores logic that, when executed by the processor, causes the electronic control unit to:
estimate the future temperature of the passenger compartment based on the retrieved weather forecast for the area in which the vehicle is located; and
send the warning to the third party.

13. The method of claim 12 further comprising a transceiver that retrieves the weather forecast from a weather data service in response to the determining that the drive system of the vehicle has been shut off, that the driver has exited the passenger compartment of the vehicle, and determining that an occupant remains in the passenger compartment of the vehicle.

14. The method of claim 13 further comprising:
providing a global positioning system connected to the electronic control unit, wherein the area that the vehicle is located in is determined by an output from the global positioning system.

15. The method of claim 14, wherein the estimated future temperature is estimated based on pre-stored maps stored in the memory unit.

16. The method of claim 15, further comprising providing an environmental condition sensor that detects an environmental condition of the vehicle.

17. The method of claim 16, wherein the electronic control unit is configured to correct the estimated future temperature based on an output of the environmental condition sensor and the retrieved weather forecast.

18. The method of claim 11, wherein the warning sent to the third party is a message displayed on a computing device.

19. The method of claim 11, wherein the predetermined range includes an upper temperature threshold and a lower temperature threshold, and wherein the estimated future temperature is determined to be outside of the predetermined range when the estimated temperature is or less than the lower temperature threshold or higher than the upper temperature threshold.

20. The method of claim 19, the predetermined time period includes a plurality of predetermined time periods, and wherein a future temperature is estimated for of each of the plurality of predetermined time period.

* * * * *